United States Patent
Sakamoto

(10) Patent No.: US 12,413,117 B2
(45) Date of Patent: Sep. 9, 2025

(54) COOLING STRUCTURE FOR ROTARY ELECTRIC MACHINE

(71) Applicant: TOYOTA JIDOSHA KABUSHIKI KAISHA, Toyota (JP)

(72) Inventor: Hironobu Sakamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 252 days.

(21) Appl. No.: 18/222,521

(22) Filed: Jul. 17, 2023

(65) Prior Publication Data
US 2024/0039367 A1    Feb. 1, 2024

(30) Foreign Application Priority Data

Jul. 26, 2022  (JP) ................ 2022-118545

(51) Int. Cl.
H02K 9/193    (2006.01)
(52) U.S. Cl.
CPC ................... H02K 9/193 (2013.01)
(58) Field of Classification Search
CPC .......... H02K 9/193; H02K 9/19; H02K 9/197; H02K 3/24
See application file for complete search history.

(56) References Cited

U.S. PATENT DOCUMENTS

| | | | |
|---|---|---|---|
| 2017/0047822 A1* | 2/2017 | Horii | ............... H02K 5/203 |
| 2019/0190350 A1 | 6/2019 | Ito et al. | |
| 2021/0226487 A1 | 7/2021 | Lim | |

FOREIGN PATENT DOCUMENTS

| | | | |
|---|---|---|---|
| DE | 202020107583 U1 | | 4/2021 |
| JP | S50-024710 A | | 3/1975 |
| JP | 2008148464 A | * | 6/2008 |
| JP | 2009089513 A | * | 4/2009 |
| JP | 2019-110695 A | | 7/2019 |
| JP | 2019-161948 A | | 9/2019 |
| JP | 2019161796 A | * | 9/2019 |
| WO | 2015/181889 A1 | | 12/2015 |

* cited by examiner

*Primary Examiner* — Tulsidas C Patel
*Assistant Examiner* — Mohammed Ahmed Qureshi
(74) *Attorney, Agent, or Firm* — Dinsmore & Shohl LLP

(57) ABSTRACT

Provided is a cooling structure for a rotary electric machine, the rotary electric machine including a ring-shaped stator, a rotor that is disposed to face the stator and is rotatable about a rotation axis, and a coil end formed in a side portion in an axial direction of the stator. The cooing structure includes a coil end cover that covers the coil end, is provided so as to be able to store a coolant therein, and has a coolant introduction hole through which the coolant is introduced and a coolant discharge hole through which the coolant stored in the coil end cover overflows and is discharged to the outside, and a coolant supply unit connected to the coolant introduction hole and configured to supply the coolant into the coil end cover.

7 Claims, 9 Drawing Sheets

AXIAL DIRECTION

AXIAL DIRECTION

COOLING STRUCTURE FOR ROTARY ELECTRIC MACHINE

CROSS-REFERENCE TO RELATED APPLICATION

This application is based upon and claims the benefit of priority of the prior Japanese Patent Application No. 2022-118545, filed on Jul. 26, 2022, the entire contents of which are incorporated herein by reference.

FIELD

The present disclosure relates to a cooling structure for a rotary electric machine.

BACKGROUND

A rotary electric machine used as a power source for a hybrid vehicle or an electric vehicle generates heat when the windings (coils) are energized. Therefore, various structures for cooling the windings have been conventionally proposed as disclosed in, for example, Japanese Patent Application Laid-Open No. 2019-161948 (Patent Document 1). The rotary electric machine proposed in Patent Document 1 includes a winding cover that covers coil ends that are parts of windings, and a coolant supply unit that is provided at a higher position than the winding cover and supplies the coolant to the windings. A coolant introduction hole for introducing the coolant into the coil ends is provided on the outer peripheral surface of the winding cover. A coolant discharge hole is provided in a lower portion of the winding cover. The discharge hole is disposed at a lower position than the output shaft (rotary shaft member) in the vertical direction and at a lower position than an air gap between the stator core and the rotor. Therefore, the rotary electric machine proposed in Patent Document 1 is cooled by the coolant that is supplied from above the windings and flows downward. The coolant that has flowed down is temporarily stored in a storage portion such as an oil pan, and is again introduced into the coil ends through the coolant supply unit. That is, the coolant cools the windings while circulating.

SUMMARY

For example, oil such as automatic transmission fluid (ATF) may be used as a coolant for cooling the windings. The viscosity of such a coolant varies depending on the temperature thereof, and the fluidity decreases as the temperature decreases. In the case that such a coolant is used, when a vehicle equipped with the rotary electric machine is parked in a cold environment and the supply of the coolant is stopped, the viscosity of the coolant that has flowed down may increase in the storage portion and the fluidity thereof may decrease. When the fluidity of the coolant decreases, it takes time for the pump to pump up the coolant when the rotary electric machine is restarted, and it is supposed that the coolant cannot be circulated immediately. The windings are not cooled unless coolant is circulated.

Therefore, an object of the present disclosure is to immediately circulate a coolant for cooling a rotary electric machine when the rotary electric machine that has been placed in a cold environment is restarted.

In one aspect of the present disclosure, there is provided a cooling structure for a rotary electric machine, the rotary electric machine including a ring-shaped stator, a rotor that is disposed to face the stator and is rotatable about a rotation axis, and a coil end formed in a side portion in an axial direction of the stator, the cooing structure including: a coil end cover that covers the coil end, is provided so as to be able to store a coolant therein, and has a coolant introduction hole through which the coolant is introduced and a coolant discharge hole through which the coolant stored in the coil end cover overflows and is discharged to the outside; and a coolant supply unit connected to the coolant introduction hole and configured to supply the coolant into the coil end cover.

The coolant discharge hole may be provided at a higher position than a lowermost position of the rotor when the rotary electric machine is installed with a radial direction of the stator being a vertical direction.

The coolant discharge hole may be provided at a higher position than the rotation axis when the rotary electric machine is installed with a radial direction of the stator being a vertical direction.

The coolant discharge hole may be provided at a plurality of locations different from each other in the vertical direction when the rotary electric machine is installed with a radial direction of the stator being a vertical direction.

The coolant introduction hole may be provided at a lower position than the coolant discharge hole, the coolant supply unit may include a coolant introduction channel that is connected to the coolant introduction hole and introduces the coolant into the coil end cover by a coolant pump, and a part of the coolant introduction channel may be disposed at a higher position than the coolant introduction hole.

The coolant introduction channel may include a coolant tank in which the coolant is stored, a coolant introduction pipe connecting the coolant introduction hole and the coolant tank, and a coolant transfer pipe connecting the coolant tank and the coolant pump, and a part of the coolant transfer pipe may be disposed at a higher position than the coolant introduction hole.

The coolant supply unit may include a shower nozzle portion that introduces the coolant into the coil end cover through the coolant introduction hole.

The shower nozzle portion may inject the coolant at an angle with respect to the coolant introduction hole so that an injected coolant flows along a circumferential direction of the stator in the coil end cover.

The cooling structure may further include a rectifying portion that reverses flow of the coolant that has passed over the coolant discharge hole, the rectifying portion being provided at a position where flow of the coolant along the circumferential direction of the stator passes over the coolant discharge hole.

The cooling structure may further include a coolant discharge portion that is connected to the coolant discharge hole and is configured to discharge the coolant from an inside of the coil end cover.

DETAILED DESCRIPTION

Figure 1:
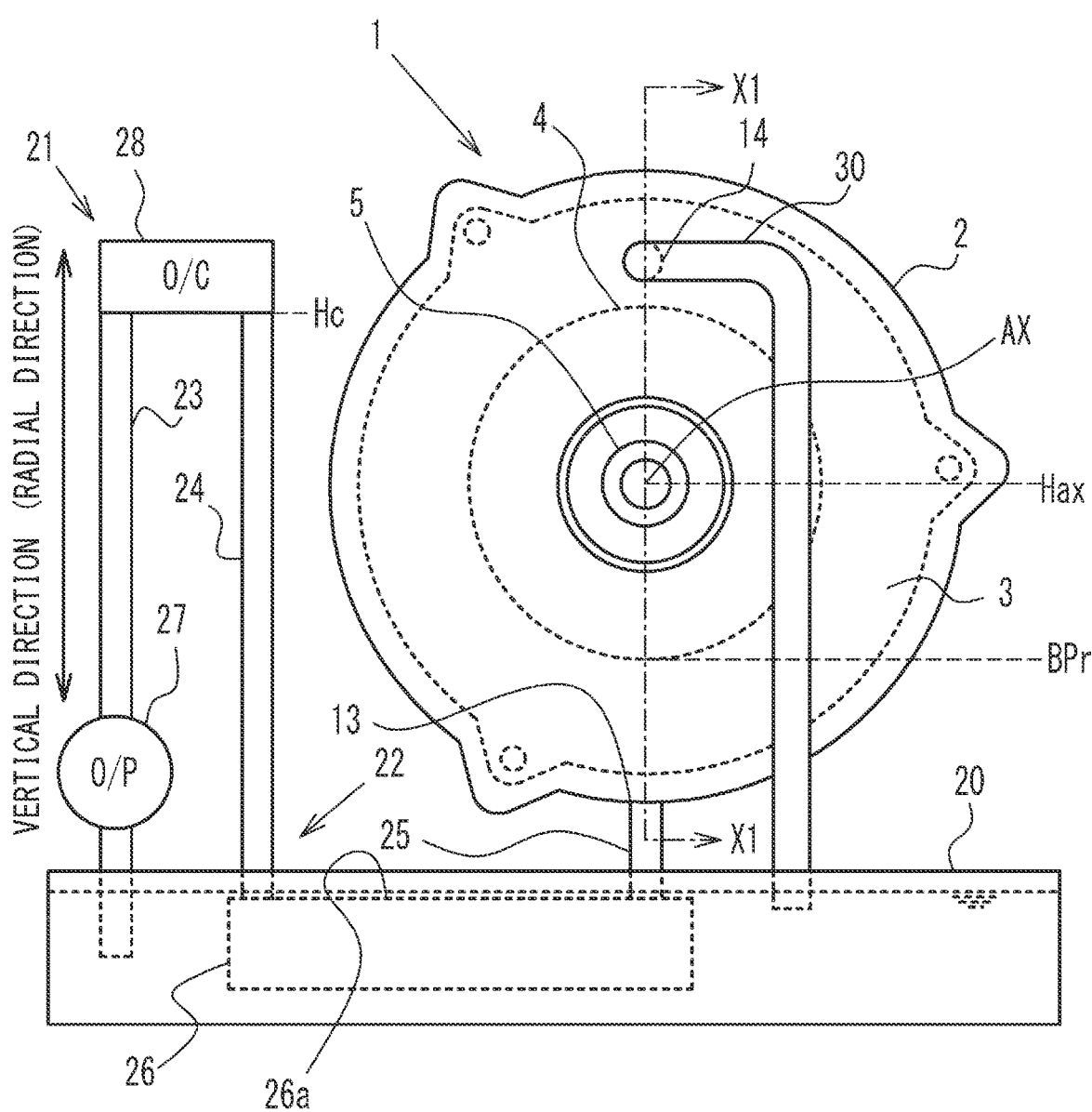
FIG. 1 is a front view schematically illustrating a cooling structure for a rotary electric machine of a first embodiment.

Hereinafter, embodiments of the present disclosure will be described with reference to the accompanying drawings. However, in the drawings, the dimensions, ratios, and the like of each component may not be illustrated so as to completely match the actual one. Further, details may be omitted in some drawings.

First Embodiment

[Configuration of Cooling Structure for Rotary Electric Machine]

Figure 2:
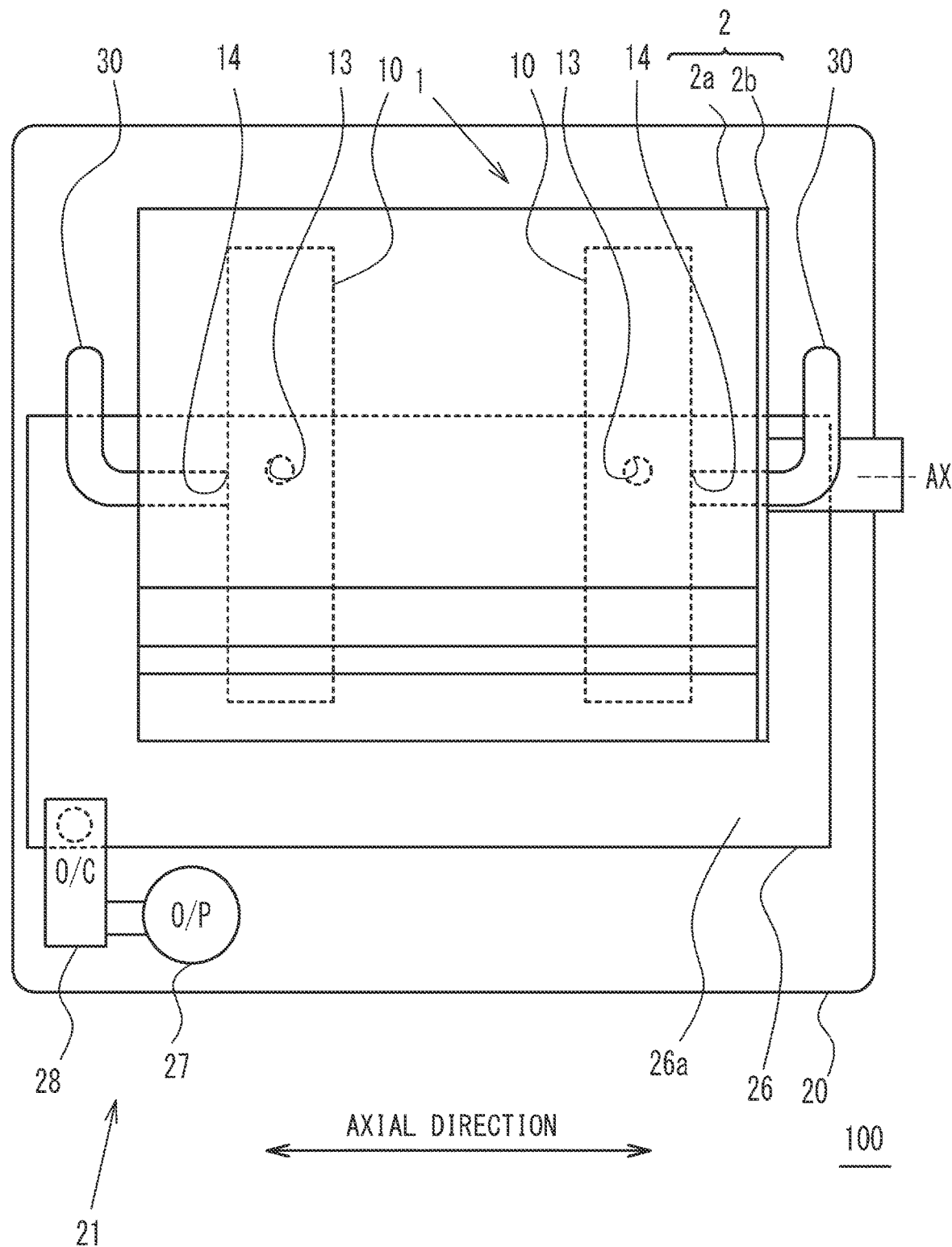
FIG. 2 is a plan view schematically illustrating the cooling structure for the rotary electric machine of the first embodiment.
Figure 3:
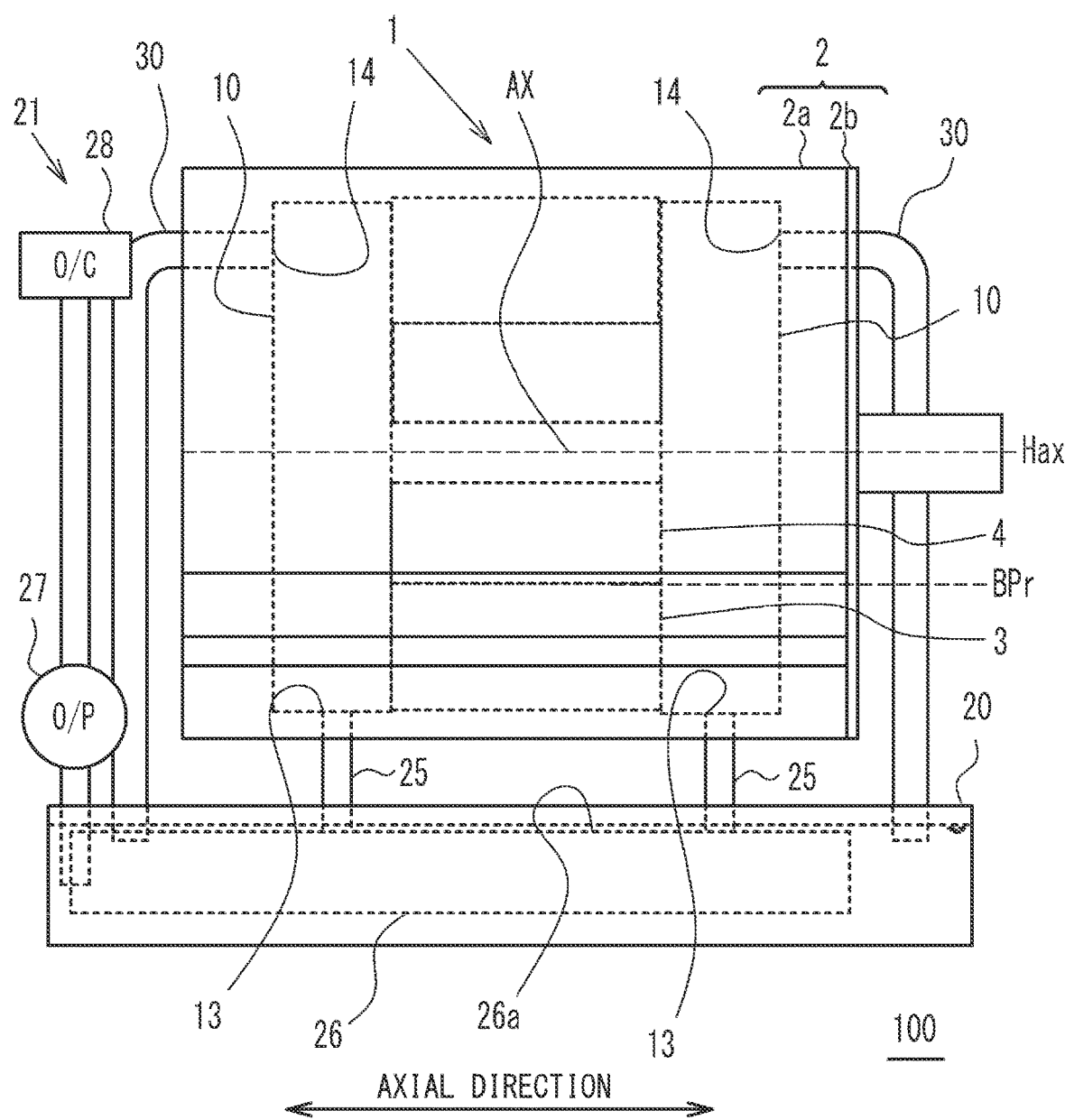
FIG. 3 is a side view schematically illustrating the cooling structure for the rotary electric machine of the first embodiment.

First, an overall configuration of a cooling structure 100 for a rotary electric machine 1 in accordance with a first embodiment (hereinafter, simply referred to as a "cooling structure") will be described with reference to FIG. 1 to FIG. 3. The cooling structure 100 cools the rotary electric machine 1. The rotary electric machine 1 is a three phase AC motor having a U phase, a V phase, and a W phase, and is used, for example, as a traveling motor of an electric-powered vehicle such as a hybrid vehicle equipped with an engine and a traveling motor as driving sources of the vehicle, an electric vehicle, and a fuel cell vehicle. The rotary electric machine 1 not only generates a driving force of a vehicle in response to power supplied from a battery (not illustrated), but also functions as a motor generator that generates electric power using power transmitted from driving wheels of the vehicle and charges the battery.

The cooling structure 100 includes an oil pan 20 that stores oil as a coolant, and coil end covers 10 that cover coil ends 3b (see FIG. 4 and FIG. 5) included in the rotary electric machine 1. The cooling structure 100 includes an oil supply unit 21 as a coolant supply unit.

The oil pan 20 is provided at a lower position than the rotary electric machine 1. The oil pan 20 can store oil that is to be supplied to the rotary electric machine 1 in order to cool the rotary electric machine 1. The oil not only cools the rotary electric machine 1 but also contributes to smooth rotation of the rotary electric machine 1.

Figure 4:
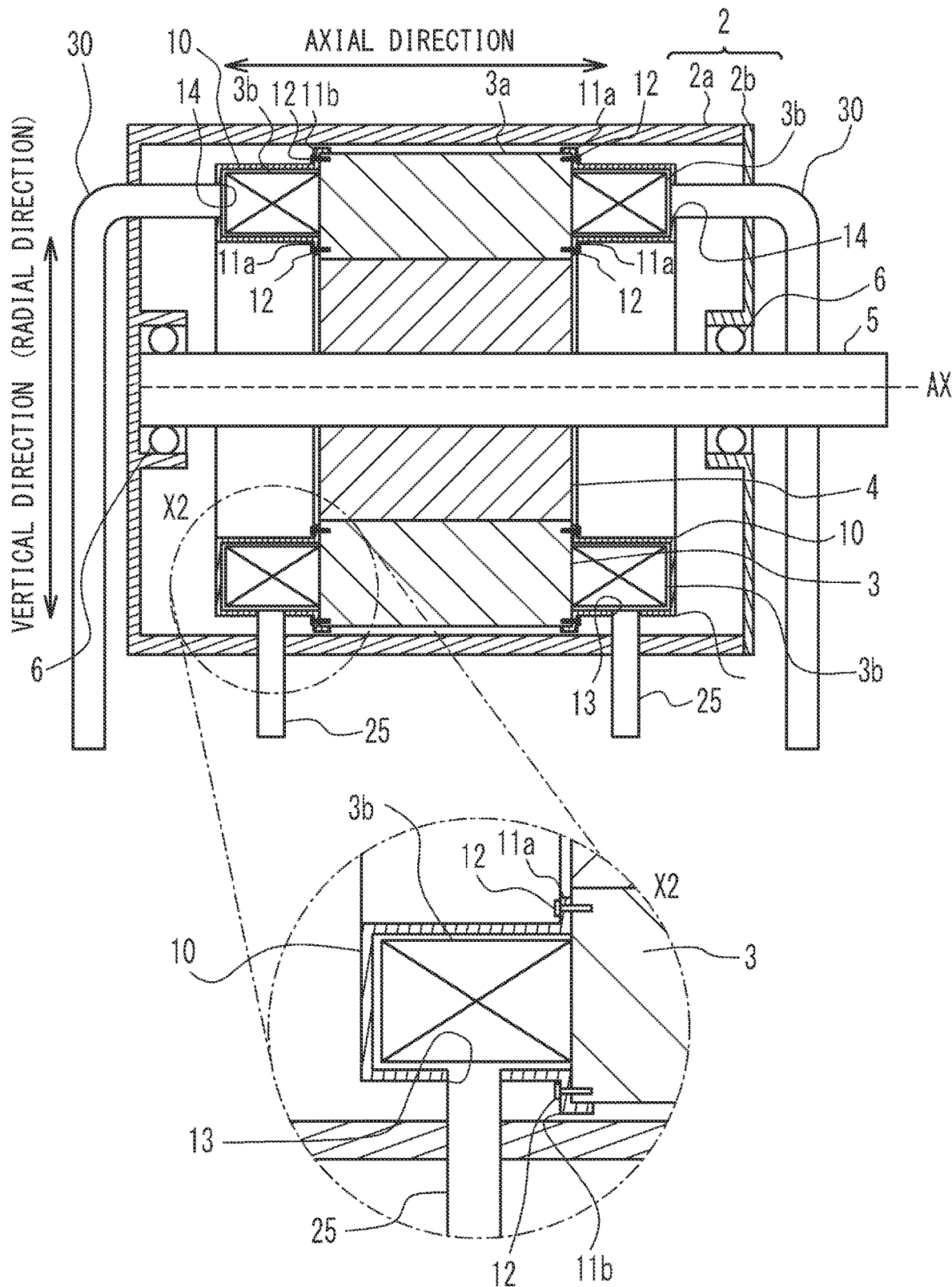
FIG. 4 is a cross-sectional view taken along line X1-X1 in FIG. 1.
Figure 5:
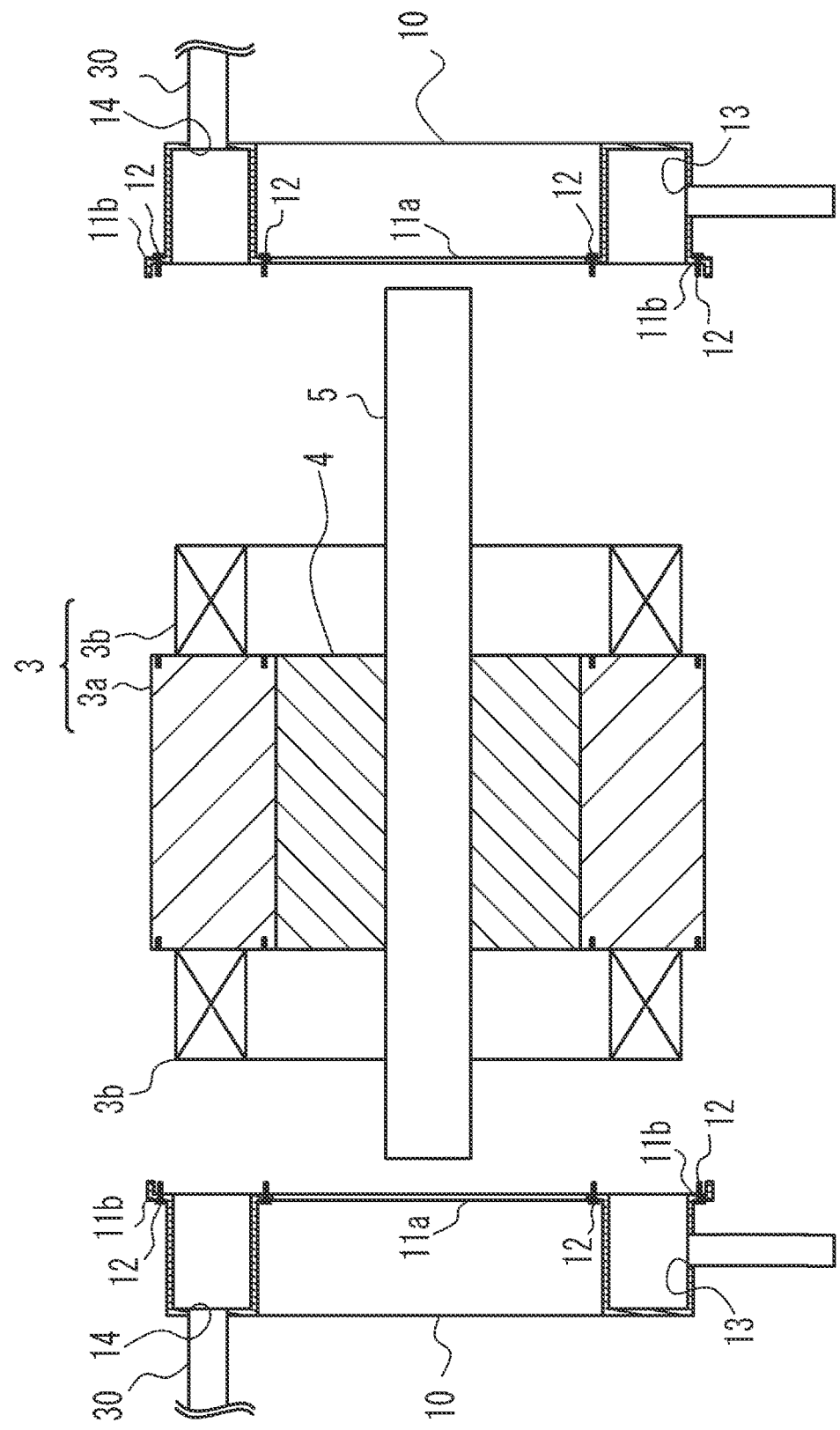
FIG. 5 is an exploded cross-sectional view illustrating a state in which coil end covers are removed from a stator in the rotary electric machine of the first embodiment.

Here, an overall configuration of the rotary electric machine 1 will be described with reference to FIG. 4 and FIG. 5. The rotary electric machine 1 includes a case 2. The case 2 includes a cylindrical case body 2a with a bottom, and a lid portion 2b attached to the opening of the case body 2a. A stator 3 and a rotor 4 are housed in the case 2.

The stator 3 includes a stator core 3a that is a substantially cylindrical magnetic component. The stator core 3a is formed by, for example, stacking magnetic plates such as electromagnetic steel plates in the axial direction. Coils are formed in the stator core 3a by arranging a plurality of segment conductors, and the coil ends 3b exposed from the stator core 3a are formed at respective sides in the axial direction of the stator core 3a. The coils include three phase coils, that is, a U-phase coil, a V-phase coil, and a W-phase coil. Note that the coil may be wound around the teeth of the stator core 3a by concentrated winding.

The rotor 4 is disposed radially inward of the stator 3 so as to be concentric with the stator 3 and face the stator 3. A rotary shaft member 5 is provided at a central portion of the rotor 4. The rotary shaft member 5 is supported by bearing portions 6 provided to the case body 2a and the lid portion 2b. Thus, the rotor 4 is supported by the case 2 so as to be rotatable about the rotation axis AX. An oil passage for circulating oil may be formed in the rotor 4 and the rotary shaft member 5 to cool the rotor 4.

<Configuration of Coil End Cover>

Next, the coil end cover 10 will be described. The coil end cover 10 is attached to the stator 3 so as to cover the coil end 3b, store oil therein, and submerge at least a part of the coil end 3b in the oil. As illustrated in FIG. 4 and FIG. 5, the coil end cover 10 is provided for each of the two coil ends 3b of the stator 3. The coil end cover 10 is formed in a ring shape corresponding to the shape of the coil end 3b. The coil end cover 10 includes an inner flange 11a provided at the inward side and an outer flange 11b provided at the outward side. As illustrated in an enlarged view of the X2 portion in FIG. 4, the coil end cover 10 is disposed so that the inner flange 11a and the outer flange 11b are in close contact with the stator 3, and is fixed to the stator 3 using bolts 12. Gaskets may be provided between the inner flange 11a and the stator 3 and between the outer flange 11b and the stator 3, respectively.

The coil end cover 10 is provided with an oil introduction hole 13 as a coolant introduction hole and an oil discharge hole 14 as a coolant discharge hole. The oil introduction hole 13 is provided at the lowest position when the rotary electric machine 1 is installed in a vehicle with the radial direction of the rotary electric machine 1 being the vertical direction. An oil introduction pipe 25 is connected to the oil introduction hole 13. The oil introduction pipe 25 will be described in detail later. An oil discharge pipe 30 as a coolant discharge portion is connected to the oil discharge hole 14. The oil discharge pipe 30 discharges the oil overflowing from the oil discharge hole 14 into the oil pan 20.

Here, the installation position of the oil discharge hole 14 in the vertical direction will be described. The coil end cover 10 stores oil therein so that a part of the coil end 3b is submerged in the oil. Therefore, the oil discharge hole 14 is provided at a higher position than the lowermost position of the stator 3, in some embodiments, at a higher position than the lowermost position BPr (see FIG. 1) of the rotor 4 when the rotary electric machine 1 is installed with the radial direction of the stator 3 being the vertical direction. This configuration causes at least a part of the coil end 3b to be submerged in the oil. In the present embodiment, the oil discharge hole 14 is provided at a higher position than the uppermost position of the rotor 4. That is, the oil discharge hole 14 is provided at a higher position than the height position Hax of the rotation axis AX in the vertical direction. Thus, a larger portion of the coil end 3b is submerged in oil.

Here, the reason why the oil is stored inside the coil end cover 10 and the coil end 3b is submerged in the oil will be described. First, a state in which the viscosity of the oil is low and the oil can circulate will be described. When the viscosity of the oil is low, in the cooling structure 100, the oil supply unit 21 introduces the oil into the coil end cover 10 from the oil introduction hole 13 provided at the lowermost portion of the coil end cover 10. The oil continuously introduced into the coil end cover 10 is sequentially discharged from the oil discharge hole 14. The discharged oil is discharged into the oil pan 20 through the oil discharge pipe 30. The discharged oil is supplied again into the coil end cover 10 through the oil supply unit 21.

In this manner, the stator 3 including the coil ends 3b is cooled by the circulating oil.

Here, for example, it is assumed that a vehicle on which the rotary electric machine 1 and the cooling structure 100 are mounted is parked in a cold environment. When the car is parked, oil is stored in the coil end cover 10, and a part of the coil end 3b is submerged in the oil. When the rotary electric machine 1 in such a state is placed in a cold environment, the viscosity of the oil in the coil end cover 10 gradually increases. That is, in a state in which the vehicle is parked, oil with reduced fluidity is stored in the coil end cover 10. When the vehicle is placed in a cold environment, the viscosity of the oil present in portions other than the coil end cover 10, for example, in the oil pan 20, also increases. For this reason, it is difficult for the oil supply unit 21 to circulate the oil.

When the rotary electric machine 1 operates, the coil provided in the stator 3 is energized. Accordingly, the coil including the coil end 3b generates heat. As a result, the temperature of the oil stored around the coil end 3b gradually increases, and the viscosity of the oil decreases.

As described above, by storing the oil inside the coil end cover 10 and submerging the coil end 3b in the oil, the heat generated by the coil can be effectively used to increase the temperature of the oil. As a result, when the rotary electric machine 1 placed under the cold environment is restarted, the oil for cooling the rotary electric machine 1 can be immediately circulated. In addition, when the rotary electric machine 1 is restarted, since the oil is present around the coil end 3b, it is possible to inhibit an excessive increase in the temperature of the coil end 3b and thus an excessive increase in the temperature of the rotary electric machine 1.

<Configuration of Oil Supply Unit>

Next, the configuration of the oil supply unit 21 will be described. With reference to FIG. 1, the oil supply unit 21 includes a coolant introduction channel 22 and an oil tank 26. The coolant introduction channel 22 includes a first pipe 23, a second pipe 24, the oil introduction pipe 25, and the oil tank 26. Further, an oil pump 27 as a coolant pump and an oil cooler 28 as a coolant cooler are provided in the coolant introduction channel 22.

The lower end portion of the first pipe 23 is disposed in the oil pan 20, and the first pipe 23 extends upward from the oil pan 20. The upper end portion of the first pipe 23 is connected to the inlet of the oil cooler 28. The oil cooler 28 is an air-cooling device including cooling fins (not illustrated), but may be a water-cooling device that cools the oil by heat exchange with another coolant, for example, cooling water. The oil pump 27 is provided between the lower end portion and the upper end portion of the first pipe 23. The oil pump 27 of the present embodiment is an electric pump, but may be a mechanical pump. The oil pump 27 sucks up the oil in the oil pan and delivers the oil to the oil cooler 28.

The upper end portion of the second pipe 24 is connected to the outlet of the oil cooler 28, and the second pipe 24 extends to the inside of the oil pan 20. The oil tank 26 is installed in the oil pan 20. The lower end portion of the second pipe 24 is connected to the inlet of the oil tank 26. The oil tank 26 includes a top plate portion 26a.

The lower end portion of the oil introduction pipe 25 is connected to the outlet of the oil tank 26. The upper end portion of the oil introduction pipe 25 is connected to the oil introduction hole 13 provided in the coil end cover 10.

The oil supplied into the coil end cover 10 by the oil supply unit 21 is sucked up from the oil pan 20 and is once pushed up to the position of the oil cooler 28. The oil that has passed through the oil cooler 28 drops to the oil tank 26. Since the oil is sequentially supplied into the oil tank 26 through the second pipe 24, the oil in the oil tank 26 is pushed out toward the oil introduction pipe 25. The oil pushed out to the oil introduction pipe 25 is introduced into the coil end cover 10.

Here, the height position He of the oil cooler 28 will be described. The oil cooler 28 is disposed at a height He higher than the height position of the oil introduction hole 13 provided in the coil end cover 10. As a result, a part of the second pipe 24 connected to the oil cooler 28 is disposed at a higher position than the oil introduction hole 13. The reason why a part of the second pipe 24 included in the coolant introduction channel 22 is disposed at a higher position than the oil introduction hole 13 is as follows. This is to prevent the oil stored in the coil end cover 10 from falling off due to its own weight even when the vehicle is parked and the oil pump 27 is stopped. Since the oil is prevented from falling off due to its own weight, a state in which the oil is stored in the coil end cover 10 can be maintained.

In the present embodiment, when the oil pump 27 is stopped, the oil in the first pipe 23 falls into the oil pan 20 by its own weight. On the other hand, the second pipe 24, the oil introduction pipe 25, and the coil end cover 10 are connected to each other through the oil tank 26. Therefore, the oil stored in these portions does not drop out, and the state is maintained.

Although the oil tank 26 of the present embodiment includes the top plate portion 26a so that the oil is easily stored in the oil tank 26, the top plate portion 26a may be removed. In this case, the oil tank 26 can be formed by installing a partition in the oil pan 20.

In the present embodiment, oil is introduced into the coil end cover 10 through the oil introduction hole 13 provided in the lowermost portion of the coil end cover 10. Therefore, it is possible to avoid stagnation of the oil in the coil end cover and to smoothly replace the oil.

When the oil pump 27 is restarted together with the rotary electric machine 1, the viscosity of the oil around the oil pump is high, and a time delay occurs until the oil is discharged from the oil pump 27. However, since the oil is stored in the coil end cover 10, an excessive increase in the temperature of the coil end 3b is reduced. When even a small amount of oil is discharged from the oil pump 27, the oil warmed in the coil end cover 10 is discharged into the oil pan 20 through the oil discharge hole 14 and the oil discharge pipe 30. Thus, the temperature rise of the oil stored in the oil pan 20 is also promoted.

In the present embodiment, even when the vehicle is parked and the oil pump 27 is stopped, the oil is stored in the coil end cover 10. Thus, when the rotary electric machine 1 placed in a cold environment is restarted, the temperature of the oil is raised by the heat generation by the coil end 3b, and the coolant for cooling the rotary electric machine 1 can be immediately circulated.

Second Embodiment

Figure 6:
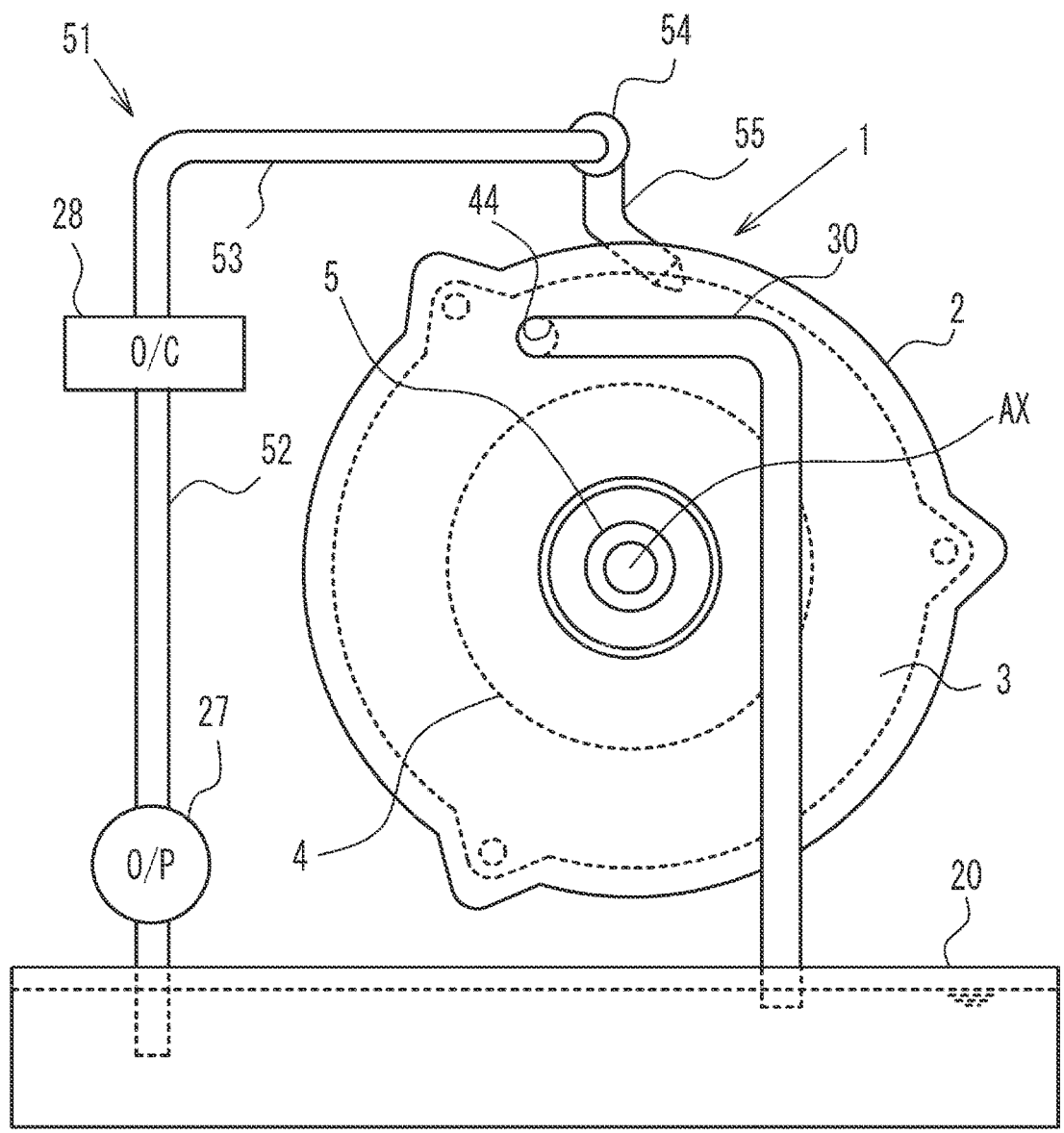
FIG. 6 is a front view schematically illustrating a cooling structure for a rotary electric machine in accordance with a second embodiment.
Figure 7:
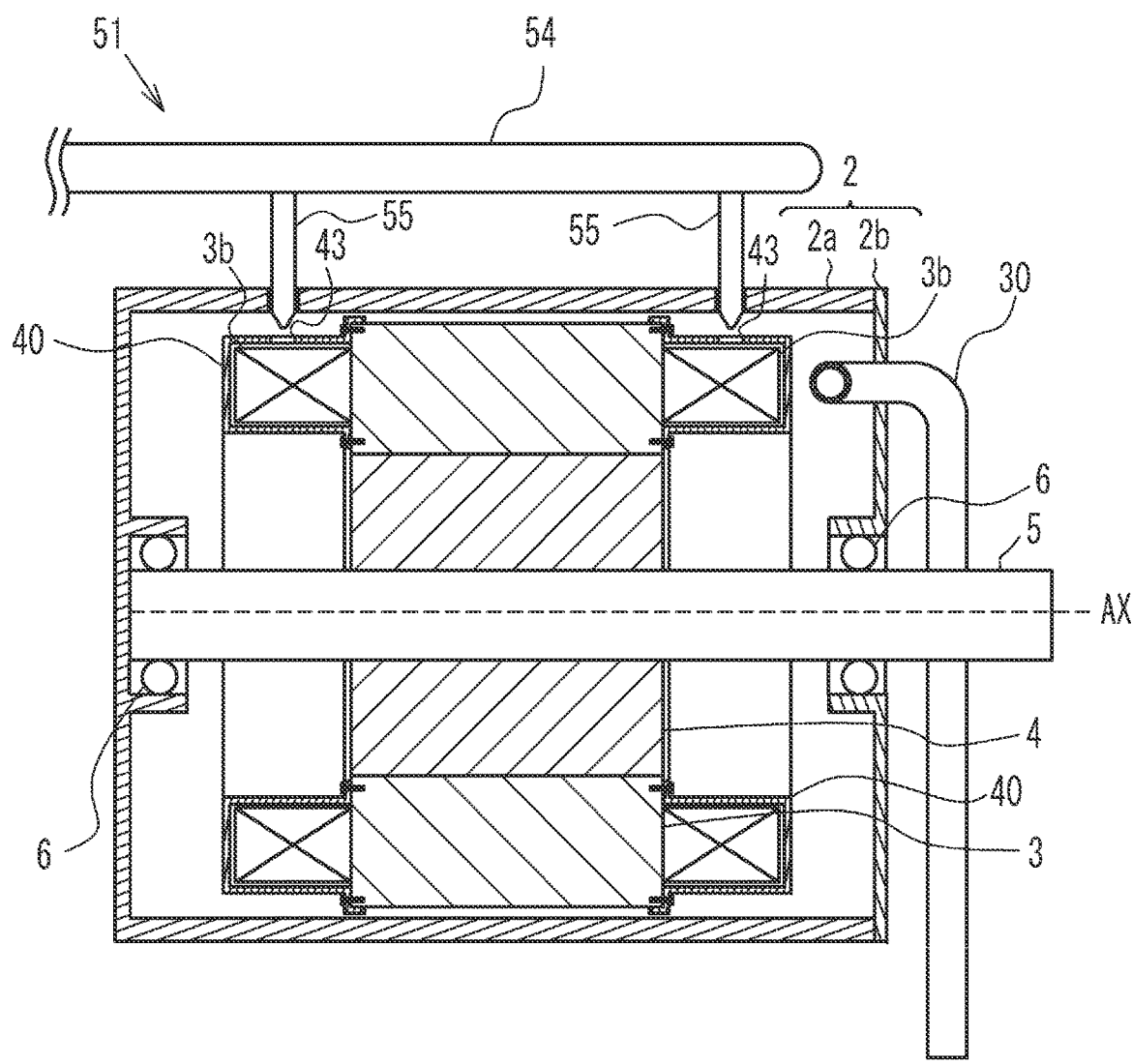
FIG. 7 is a cross-sectional view of the rotary electric machine of the second embodiment.
Figure 8:
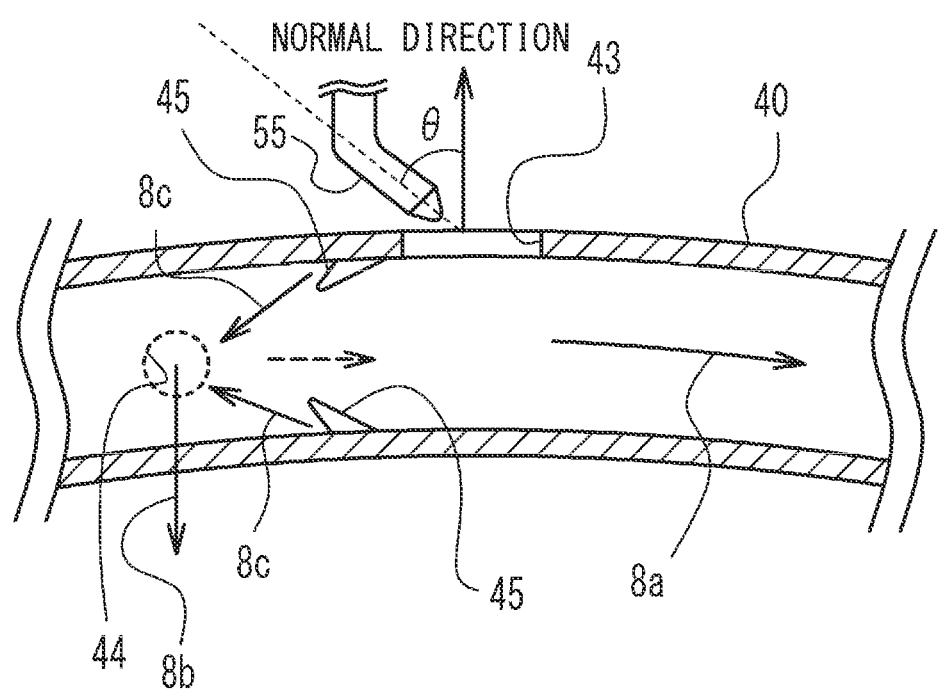
FIG. 8 schematically illustrates a state in which the coolant is injected from a shower nozzle portion in the second embodiment.

Next, a cooling structure 200 in accordance with a second embodiment will be described with reference to FIG. 6 to FIG. 8. The cooling structure 200 of the second embodiment includes an oil supply unit 51 instead of the oil supply unit 21 included in the cooling structure 100 of the first embodiment. In addition, the coil end cover 10 is replaced with a coil end cover 40 in accordance with the change of the oil supply unit. Further, the length of the oil discharge pipe 30 is different. Since other configurations are substantially the same between the first embodiment and the second embodiment, common components are denoted by the same reference numerals in the drawings, and a detailed description thereof is omitted. Differences from the first embodiment will be mainly described below.

The oil supply unit 51 includes a first pipe 52, a second pipe 53, a shower pipe 54, and a shower nozzle portion 55. The lower end portion of the first pipe 52 is disposed in the oil pan 20 and extends upward from the oil pan 20. The upper end portion of the first pipe 52 is connected to the inlet of the oil cooler 28. The oil pump 27 is disposed in the first pipe 52. A first end portion of the second pipe 53 is connected to the outlet of the oil cooler 28. A second end portion of the second pipe 53 is connected to the shower pipe 54. The shower nozzle portion 55 extends from the shower pipe 54. The shower nozzle portion 55 is provided so as to inject oil toward an oil introduction hole 43 provided in the top position of the outer periphery of the coil end cover 40. The shower nozzle portion 55 is installed so that an injection angle with respect to a normal direction of the coil end cover 40 is θ. By setting the injection angle to θ, the oil is injected into the coil end cover 40 so that the injected oil flows along the circumferential direction of the coil end cover 40, that is, the circumferential direction of the stator 3, as indicated by an arrow 8a in FIG. 8.

An oil discharge hole 44 is provided at a position where the oil introduced from the oil introduction hole 43 makes substantially one round in the coil end cover 40 along the circumferential direction thereof. As a result, the oil travels around the inside of the coil end cover 40 and is discharged to the outside of the coil end cover 40, as indicated by an arrow 8b in FIG. 8.

In the coil end cover 40, a rectifying portion 45 is provided at a position where the flow of the oil along the circumferential direction of the stator 3, that is, the circumferential direction of the coil end cover 40 passes over the oil discharge hole 44. The rectifying portion 45 causes the flow of the oil that has passed over the oil discharge hole 44 to flow backward. As a result, the oil flows backward as indicated by an arrow 8c and is discharged to the outside of the coil end cover 40 as indicated by the arrow 8b. When the oil is circulated many times in the coil end cover 40, the cooling efficiency decreases. Therefore, in order to efficiently discharge the oil that has circulated once, the rectifying portion 45 is provided.

As with the coil end cover 10 of the first embodiment, the coil end cover 40 of the second embodiment can be in a state in which oil is always stored. Therefore, even when the vehicle is parked and the oil pump 27 is stopped, oil is stored in the coil end cover 40. Thus, when the rotary electric machine 1 placed in a cold environment is restarted, the temperature of the oil is raised by the heat generation of the coil end 3b, and the coolant for cooling the rotary electric machine 1 can be immediately circulated.

Figure 9:
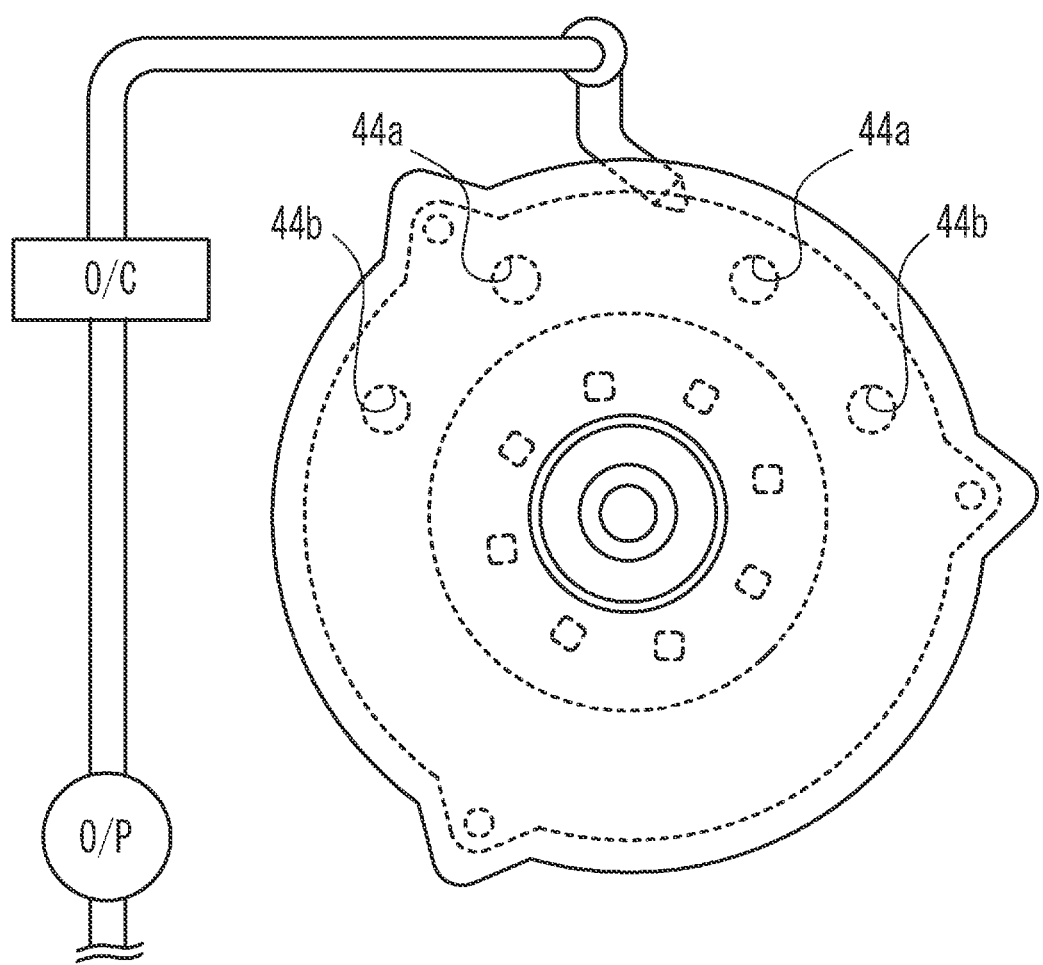
FIG. 9 illustrates a variation of the rotary electric machine.

When the oil circulates in the coil end cover 40, the cooling efficiency of the coil end 3b decreases. Therefore, as illustrated in FIG. 9, a plurality of oil discharge holes 44a and 44b may be provided. In this configuration, by providing the oil discharge holes at a plurality of locations different in the vertical direction, such as the oil discharge holes 44a and 44b, it is possible to increase the total area of the opening portions and to increase the oil discharge amount. The addition of the oil discharge hole can also be applied to the first embodiment.

It is obvious from the above description that the above-described embodiments are merely examples for carrying out the present disclosure, the present disclosure is not limited to these embodiments, various modifications of these embodiments are within the scope of the present disclosure, and further, other various embodiments are possible within the scope of the present disclosure.

What is claimed is:

1. A cooling structure for a rotary electric machine, the rotary electric machine including a ring-shaped stator, a rotor that is disposed to face the stator and is rotatable about a rotation axis, and a coil end formed in a side portion in an axial direction of the stator, the cooing structure comprising:
   a coil end cover that covers the coil end, is provided so as to be able to store a coolant therein, and has a coolant introduction hole through which the coolant is introduced and a coolant discharge hole through which the coolant stored in the coil end cover overflows and is discharged to the outside;
   rectifying portion that reverses flow of the coolant that has passed over the coolant discharge hole; and
   a coolant supply unit connected to the coolant introduction hole and configured to supply the coolant into the coil end cover, the coolant supply unit includes a shower nozzle portion that introduces the coolant into the coil end cover through the coolant introduction hole, the shower nozzle portion injects the coolant at an angle with respect to the coolant introduction hole so that an injected coolant flows along a circumferential direction of the stator in the coil end cover,
   wherein the rectifying portion being provided at a position where flow of the coolant along the circumferential direction of the stator passes over the coolant discharge hole.

2. The cooling structure for the rotary electric machine according to claim 1, wherein the coolant discharge hole is provided at a higher position than a lowermost position of the rotor when the rotary electric machine is installed with a radial direction of the stator being a vertical direction.

3. The cooling structure for the rotary electric machine according to claim 1, wherein the coolant discharge hole is provided at a higher position than the rotation axis when the rotary electric machine is installed with a radial direction of the stator being a vertical direction.

4. The cooling structure for the rotary electric machine according to claim 1, wherein the coolant discharge hole is provided at a plurality of locations different from each other in a vertical direction when the rotary electric machine is installed with a radial direction of the stator being a vertical direction.

5. The cooling structure for the rotary electric machine according to claim 1,
   wherein the coolant introduction hole is provided at a lower position than the coolant discharge hole,
   wherein the coolant supply unit includes a coolant introduction channel that is connected to the coolant introduction hole and introduces the coolant into the coil end cover by a coolant pump, and
   wherein a part of the coolant introduction channel is disposed at a higher position than the coolant introduction hole.

6. The cooling structure for the rotary electric machine according to claim 5, wherein the coolant introduction channel includes a coolant tank in which the coolant is stored, a coolant introduction pipe connecting the coolant introduction hole and the coolant tank, and a coolant transfer pipe connecting the coolant tank and the coolant pump, and wherein a part of the coolant transfer pipe is disposed at a higher position than the coolant introduction hole.

7. The cooling structure for the rotary electric machine according to claim 1, further comprising a coolant discharge portion that is connected to the coolant discharge hole and is configured to discharge the coolant from an inside of the coil end cover.

\* \* \* \* \*